Patented Feb. 14, 1933

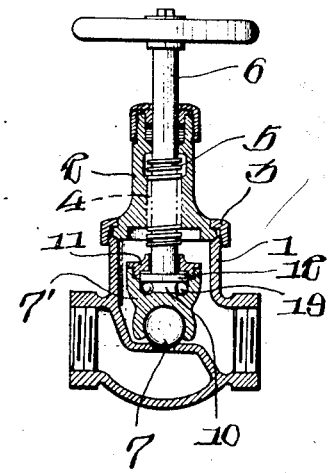

1,897,687

UNITED STATES PATENT OFFICE

DENZO YOSHIZAWA, OF NAKANO MACHI, TOYOTAMA GUN, TOKYO FU, JAPAN, ASSIGNOR TO HISAKICHI KUBODERA, OF TOKYO, JAPAN

VALVE

Application filed April 29, 1931, Serial No. 533,822, and in Japan May 15, 1930.

The present invention relates to improvements in valves, characterized by the fact that in a valve of the type having a stem constructed separately from a member for opening and closing the passage of fluid, balls are inserted between the said stem and member so that the stem may be able to revolve freely without transmitting any rotary motion to the said member. The object thereof is to obtain such a valve that only compression is transmitted effectively to a closing member by entirely eliminating the twist due to the revolution of the stem by means of the balls and thus said member is pressed to the valve seat tightly and also the wear due to the rubbing of the seat is reduced to enable the valve to stand long use.

The accompanying drawing shows a longitudinal section through a valve having a spherical closing member.

In the drawing, 1 is a valve casing, and 2 a cap mounted thereon fixedly by suitable means such as a nut 3 and threaded internally as shown at 4 with a thread 5 of the stem 6 screwed through it.

The closing ball member 7 is supported rotatably in a spherical recess in the bottom of the supporting bearing 7', which bearing has a recess 10 in its upper end receiving the enlarged flat head 12 of the stem 6. The recess 10 is closed by a cover 11, and several small balls 19 are inserted between the lower end 12 of the stem 6 and the bottom of the recess 10. The stem 6, when revolved in one direction, descends with respect to the cap 2 and the flat collar 12 lowers the closing member 7, 7' through the balls 19 and brings the spherical ball 7 of the closing member into contact with the valve seat so that the passage of fluid is stopped. At this time the twist due to the revolution of the stem is absorbed completely by the balls 19, which act only to press the closing member downwardly so the closing surface of the closing member and the valve seat do not undergo the rubbing action and consequently have their wear reduced considerably.

I claim:

1. In a valve, the combination of a casing having a valve seat, a valve stem having a collar on its lower end, a supporting bearing; means for locking the bearing to the collar; a valve ball carried by the bearing adapted to engage the valve seat, and a series of balls interposed between the collar and the bearing.

2. In a valve, the combination of a casing having a valve seat, a valve stem having a collar on its lower end, a supporting bearing and having a recess receiving the collar, a cover on the bearing locking the collar in the recess, a valve ball carried by the bearing adapted to engage the valve seat, and a series of balls in the recess interposed between the collar and the bottom of the recess.

DENZO YOSHIZAWA.